United States Patent
Rogers et al.

(10) Patent No.: US 10,316,749 B2
(45) Date of Patent: Jun. 11, 2019

(54) CONDUIT FOR GUIDING LOW PRESSURE COMPRESSOR INNER DIAMETER SHROUD MOTION

(71) Applicant: UNITED TECHNOLOGIES CORPORATION, Farmington, CT (US)

(72) Inventors: Daniel S. Rogers, Springvale, ME (US); Stephen W. Milks, Sanford, ME (US); Steven J. Feigleson, Falmouth, ME (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 777 days.

(21) Appl. No.: 14/855,859

(22) Filed: Sep. 16, 2015

(65) Prior Publication Data
US 2016/0108812 A1   Apr. 21, 2016

Related U.S. Application Data

(60) Provisional application No. 62/066,136, filed on Oct. 20, 2014.

(51) Int. Cl.
*F02C 7/20* (2006.01)
*F02C 7/06* (2006.01)
(Continued)

(52) U.S. Cl.
CPC ............. *F02C 7/06* (2013.01); *F01D 25/246* (2013.01); *F02C 3/04* (2013.01); *F02C 7/20* (2013.01);
(Continued)

(58) Field of Classification Search
CPC ............. F02C 7/20; F01D 25/28; F01D 25/16
See application file for complete search history.

(56) References Cited

U.S. PATENT DOCUMENTS 2,190,170 A * 2/1940 Campbell ............... F01D 25/28
248/637
3,006,587 A * 10/1961 Morel ..................... B64D 27/26
248/554
(Continued)

FOREIGN PATENT DOCUMENTS

WO    9817896 A1    4/1998

OTHER PUBLICATIONS

European Search Report for Application No. 15189631.3-1610; dated Mar. 9, 2016; 9 pages.

*Primary Examiner* — Gerald L Sung
(74) *Attorney, Agent, or Firm* — Cantor Colburn LLP (57) ABSTRACT

Conduits for guiding the motion of an inner diameter shroud of a low pressure compressor of a gas turbine engine are disclosed. The inner diameter shroud has at least three slots formed in one or more radially inwardly extending flanges. Each of the conduits are configured to assemble with a respective one of the at least three slots. Each conduit comprises a bushing having a first panel, and the first panel is capable of being inserted in a respective one of the slots of the inner diameter shroud. The conduit further comprises a bracket capable of being attached to a bearing support of a fan intermediate case of the gas turbine engine. The bushing is capable of being attached to the bracket. A contact between the first panel and the at least one slot of the inner diameter shroud restricts a circumferential rotation of the inner diameter shroud with respect to a central axis of the gas turbine engine when the first panel is inserted in the at least one slot, but allows a radial motion of the inner diameter shroud with respect to the central axis.

19 Claims, 7 Drawing Sheets

(51) Int. Cl.
*F02C 3/04* (2006.01)
*F01D 25/24* (2006.01)
*F01D 25/28* (2006.01)

(52) U.S. Cl.
CPC .......... *F01D 25/28* (2013.01); *F05D 2220/32* (2013.01); *F05D 2240/50* (2013.01); *F05D 2260/30* (2013.01); *F05D 2260/36* (2013.01); *F05D 2300/50212* (2013.01)

(56) References Cited

U.S. PATENT DOCUMENTS

| | | | | |
|---|---|---|---|---|
| 3,860,359 | A | * | 1/1975 | De Feo .................. F01D 25/28 415/208.2 |
| 5,395,211 | A | | 3/1995 | Johnson |
| 5,810,558 | A | * | 9/1998 | Streeter .................. F01D 25/28 415/213.1 |
| 6,216,442 | B1 | * | 4/2001 | Belsom .................... F02C 7/20 60/752 |
| 6,347,508 | B1 | * | 2/2002 | Smallwood ............. F01D 9/023 60/796 |
| 7,025,563 | B2 | | 4/2006 | Servadio et al. |
| 2005/0257521 | A1 | * | 11/2005 | Anello .................... F01D 25/28 60/602 |
| 2010/0135770 | A1 | * | 6/2010 | Durocher ................ F01D 9/065 415/69 |
| 2013/0291544 | A1 | * | 11/2013 | Eastwood ................ F23R 3/50 60/734 |
| 2015/0226124 | A1 | * | 8/2015 | Tsutsumi ............. F01D 25/246 415/193 |

* cited by examiner

FIG.9

CONDUIT FOR GUIDING LOW PRESSURE COMPRESSOR INNER DIAMETER SHROUD MOTION

CROSS REFERENCE TO RELATED APPLICATIONS

This application is a non-provisional application claiming priority to 35 U.S.C. § 119(e) benefit of U.S. Provisional Patent Application No. 62/066,136 filed on Oct. 20, 2014.

FIELD OF THE DISCLOSURE

The present disclosure generally relates to gas turbine engines, and more specifically, relates to conduits for guiding the motion of shrouds in gas turbine engines.

BACKGROUND

Gas turbine engines, such as those used to provide thrust to an aircraft, are internal combustion engines that use air as the working fluid. In general, gas turbine engines may include, among other features, a fan section and a core engine located downstream of the fan section. In operation, air may be drawn into the engine and accelerated by the fan section, and a fraction of the indrawn air may be routed through a primary flow path defined by the core engine. In an upstream to downstream order, the core engine may include: 1) a compressor section which may include a low pressure compressor (LPC) and a high pressure compressor (HPC), 2) one or more combustors, 3) a turbine section, and 4) an exhaust nozzle. In the primary flow path, the air may first be compressed/pressurized in the compressor section and it may then be combusted with fuel in the combustor(s) to generate hot combustion gases. The hot combustion gases may then expand through the turbine section, where energy may be extracted to drive the rotation of the turbine section, the compressor section, and the fan section, as all may be mounted on one or more common shafts. The gases may then be exhausted through the exhaust nozzle to provide forward thrust to an associated aircraft, or to provide power if used in other applications.

The compressor section and the turbine section may include alternating stages of stator assemblies with stationary airfoils (vanes) and rotor assemblies with rotating airfoils (blades). In rotor assemblies, the blades may be attached to a rotating disk or hub. In stator assemblies, the vanes may extend between two stationary (non-rotating) shrouds, including an inner diameter (ID) shroud and an outer diameter (OD) shroud located radially outward of the ID shroud with respect to an engine central axis.

Depending on the local temperatures and the materials making up the core engine components, the core engine components may undergo subtle thermal expansion or contraction. Unlike other regions of the core engine which are exposed to hot compressed and/or combusted gases, the inlet stator assembly of the LPC is exposed to lower temperature air that has not yet undergone compression or combustion. Due to the relatively low gas temperatures in the local flow path, the inner diameter (ID) shroud of the inlet stator assembly may be formed from lightweight materials such as aluminum which has a higher coefficient of thermal expansion (CTE) than higher strength metals such as titanium and nickel based alloys used for other engine components. Therefore, the ID shroud of the LPC inlet stator assembly may expand and contract more readily in response to temperature fluctuations than titanium- or nickel alloy-based components of the gas turbine engine.

At certain flight points, the ID shroud of the LPC inlet stator assembly may be driven to radial contraction due to exposure to a relatively cold gas path. However, the ID shroud may be mated to an upstream titanium-based bearing support and fan intermediate case which may be driven to radial expansion due to exposure to hot engine oil. The conflicting expansion/contraction tendencies and expansion/contraction rates may lead to a thermal fight between the fan intermediate case/bearing support and the ID shroud of the LPC inlet stator assembly. This occurrence may ultimately lead to stresses and/or low cycle fatigue issues in the ID shroud of the LPC inlet stator assembly.

Thus, there is a need for engine designs which mitigate or eliminate stresses caused by thermal growth mismatches between fan intermediate cases/bearing supports and ID shrouds of LPC shrouds of LPC inlet stator assemblies. U.S. Pat. No. 7,025,563 discloses the use of an outer shroud seal to accommodate thermal growth mismatches between an aluminum-based outer shroud of a LPC exit stator assembly and other titanium-based stator assembly components. While effective, the design does not address thermal fight issues between fan intermediate cases and ID shrouds of LPC inlet stator assemblies. The present disclosure addresses this problem.

SUMMARY

In accordance with one aspect of the present invention, conduits for guiding the motion of an inner diameter shroud of a low pressure compressor of a gas turbine engine are disclosed. The inner diameter shroud may have at least three slots formed in one or more radially inwardly extending flanges. Each of the conduits may be configured to assemble with a respective one of the at least three slots. Each of the conduits may comprise a bushing having a first panel, and the first panel may be capable of being inserted in one of the at least three slots of the inner diameter shroud. The conduit may further comprise a bracket capable of being attached to a bearing support of a fan intermediate case of the gas turbine engine, and the bushing may be capable of being attached to the bracket. A contact between the slot of the inner diameter shroud and the first panel may restrict a circumferential rotation of the inner diameter shroud with respect to a central axis of the gas turbine engine, but may allow a radial motion of the inner diameter shroud with respect to the central axis.

In another refinement, a lateral width of the first panel may be less than a lateral width of the at least one slot.

In another refinement, the first panel may include outer edges configured to contact inner edges of the at least one slot, and the contact between the outer edges of the first panel and the inner edges of the at least one slot may restrict the circumferential rotation of the inner diameter shroud.

In another refinement, the bushing may be a T-bushing.

In another refinement, the T-bushing may further include a second panel.

In another refinement, the lateral width of the first panel may be smaller than a lateral width of the second panel.

In another refinement, the second panel may be configured to contact an aft face of the radially inwardly extending flange. The contact between the second panel and the aft face of the flange may restrict an axial motion of the inner diameter shroud with respect to the central axis.

In another refinement, an aft face of the bracket may be configured to contact a forward face of the radially inwardly extending flange. The contact between the aft face of the bracket and the forward face of the flange may further restrict the axial motion of the inner diameter shroud with respect to the central axis.

In another refinement, the T-bushing may include a height-wise extending ridge protruding from a forward face of the first panel, and the bracket may include a height-wise extending slot that is configured to receive the height-wise extending ridge.

In another refinement, an axial thickness of the first panel may be thicker than an axial thickness of the at least on slot to provide a clearance to allow the radial motion of the inner diameter shroud.

In another refinement, the T-bushing may be configured to mechanically attach to the bracket with at least one fastener.

In another refinement, the bracket may include an aperture, the T-bushing may include an aperture extending through the first panel and the second panel, and the aperture of the bracket and the aperture of the T-bushing may be configured to receive the at least one fastener.

In accordance with another aspect of the present disclosure, a gas turbine engine is disclosed. The gas turbine engine may comprise a fan section, a fan intermediate case having a bearing support, and a compressor section located downstream of the fan intermediate case. The compressor section may include a low pressure compressor and a high pressure compressor. The low pressure compressor may have an inlet stator assembly which may include an inner diameter shroud supporting a plurality of inlet guide vanes, and the inner diameter shroud may have at least three slots formed in one or more radially inwardly extending flanges. The gas turbine engine may further comprise conduits for guiding the motion of the inner diameter shroud. Each of the conduits may be associated with a respective one of the at least three slots. Each of the conduits may include a bushing having a first panel, and the first panel may be inserted in one of the at least three slots of the inner diameter shroud. The conduit may further comprise a bracket attached to the bearing support, and the bushing may be attached to the bracket. A contact between the slot of the inner diameter shroud and the first panel may restrict a circumferential rotation of the inner diameter shroud with respect to a central axis of the gas turbine engine, but may allow a radial motion of the inner diameter shroud with respect to the central axis. In addition, the gas turbine engine may further comprise a combustor located downstream of the compressor section, and a turbine section located downstream of the combustor.

In another refinement, the bushing may be a T-bushing that includes a second panel having a lateral width that is larger than a lateral width of the first panel.

In another refinement, the second panel may be configured to contact an aft face of the radially inwardly extending flange. The contact between the second panel and the aft face of the flange may restrict an axial motion of the inner diameter shroud with respect to the central axis.

In another refinement, an aft face of the bracket may be configured to contact a forward face of the radially inwardly extending flange. The contact between aft face of the bracket and the forward face of the flange may further restrict the axial motion of the inner diameter shroud.

In another refinement, the inner diameter shroud may have a coefficient of thermal expansion that is higher than a coefficient of thermal expansion of the bearing support and the fan intermediate case.

In another refinement, the T-bushing may further include a height-wise extending ridge protruding from a forward face of the first panel.

In another refinement, the bracket may further include a height-wise extending slot that receives the height-wise extending ridge.

In accordance with another aspect of the present disclosure, a method for guiding the motion of an inner diameter shroud of a low pressure compressor of a gas turbine engine is disclosed. The inner diameter shroud may have at least three slots formed in one or more radially inwardly extending flanges. The method may comprise: 1) providing conduits each including a bracket and a bushing having at least one first panel, and 2) assembling each of the conduits with a respective one of the at least three slots by attaching the bracket to a bearing support of a fan intermediate case of the gas turbine engine, inserting the first panel of the bushing into the at least one slot, and attaching the bushing to the bracket. The method may further comprise allowing a radial motion of the inner diameter shroud with respect to the central axis.

These and other aspects and features of the present disclosure will be more readily understood when read in conjunction with the accompanying drawings.

It should be understood that the drawings are not necessarily drawn to scale and that the disclosed embodiments are sometimes illustrated schematically and in partial views. It is to be further appreciated that the following detailed description is merely exemplary in nature and is not intended to limit the invention or the application and uses thereof. In this regard, it is to be additionally appreciated that the described embodiment is not limited to use with ID shrouds of low pressure compressors of gas turbine engines. Hence, although the present disclosure is, for convenience of explanation, depicted and described as certain illustrative embodiments, it will be appreciated that it can be implemented in various other types of embodiments and in various other systems and environments.

DETAILED DESCRIPTION

Figure 1:
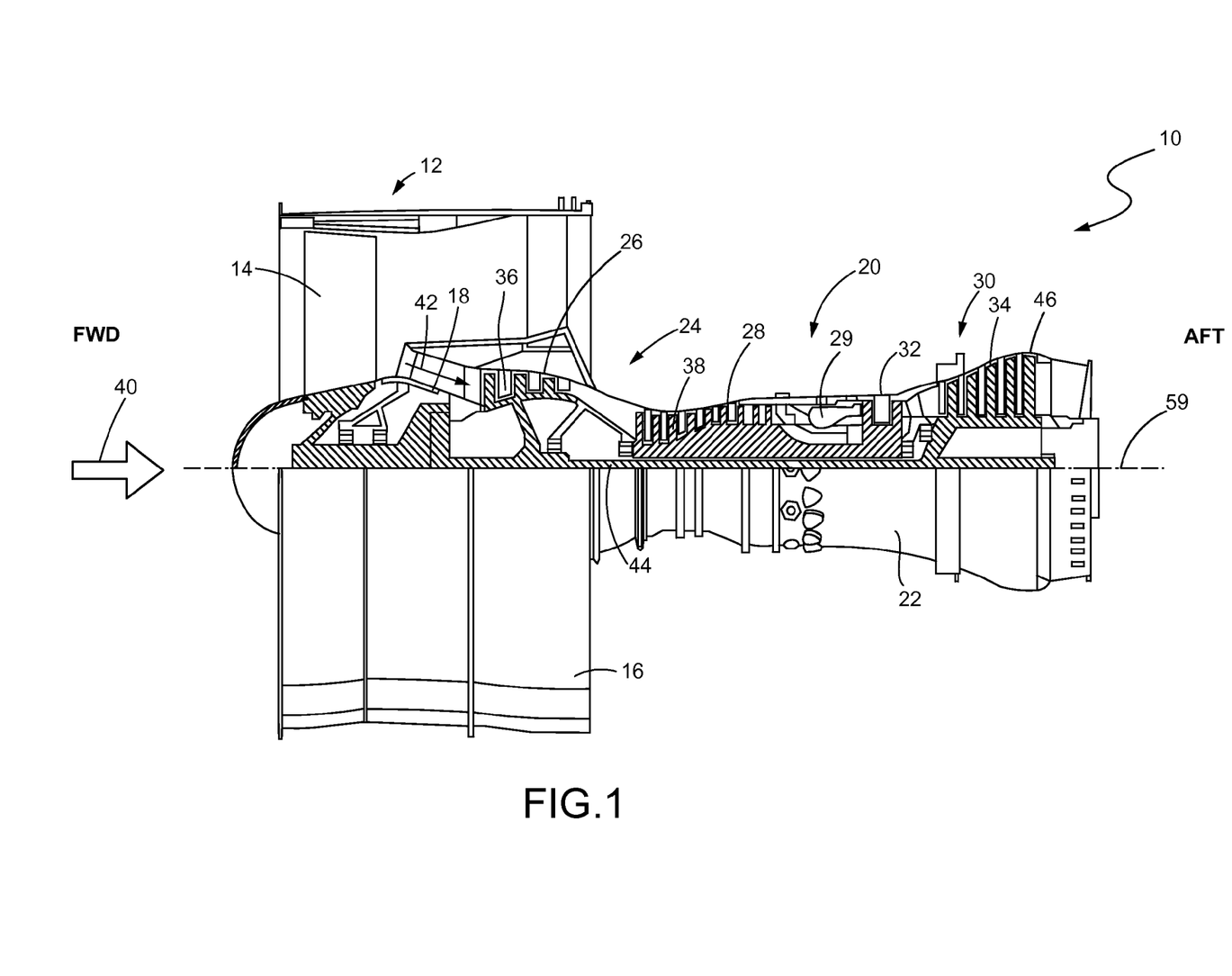
FIG. 1 is a cross-sectional view of a gas turbine engine, constructed in accordance with the present disclosure.

Referring now to the drawings, and with specific reference to FIG. 1, a gas turbine engine 10 is shown. The gas turbine engine 10 may be associated with an aircraft to provide thrust, or it may be used to provide power in other applications. The gas turbine engine 10 includes a fan section 12 having a fan 14 surrounded by a fan case 16, as well as a fan intermediate case 18 leading to a core engine 20. The core engine 20 is enclosed in an engine case 22 and located downstream of the fan 14, as shown. In an upstream to downstream direction, the core engine 20 includes: 1) a compressor section 24 which includes a low pressure compressor (LPC) 26 upstream from a high pressure compressor (HPC) 28, 2) one or more combustors 29, and 3) a turbine section 30 which includes a high pressure turbine 32 upstream from a low pressure turbine 34. In addition, the compressor section 24 and the turbine section 30 each include alternating stages of non-rotating stator assemblies 36 and rotating rotor assemblies 38.

In operation, air 40 is drawn into the engine 10 and accelerated by the rotating blades of the fan 14. After passing the fan section 12, a fraction of the indrawn air is routed through a primary flow path 42 defined by the core engine 20. In the primary flow path 42, the air 40 is first compressed and pressurized in the compressor section 24, and it then enters the combustor(s) 29 where it is mixed with fuel and combusted to generate hot combustion gases. The hot combustion gases then expand through and drive the rotation of the turbine section 30 which, in turn, drive the rotation of the compressor section 24 and the fan section 12, as all are mounted on one or more common shafts 44. The gases are then exhausted through an exhaust nozzle 46 to provide forward thrust to an associated aircraft. Although the gas turbine engine 10 is shown in FIG. 1 as a two spool turbofan engine, it will be understood that the engine 10 may have other architectures as well, such as a three-spool turbofan with mid-pressure compressor and turbine sections.

Figure 2:
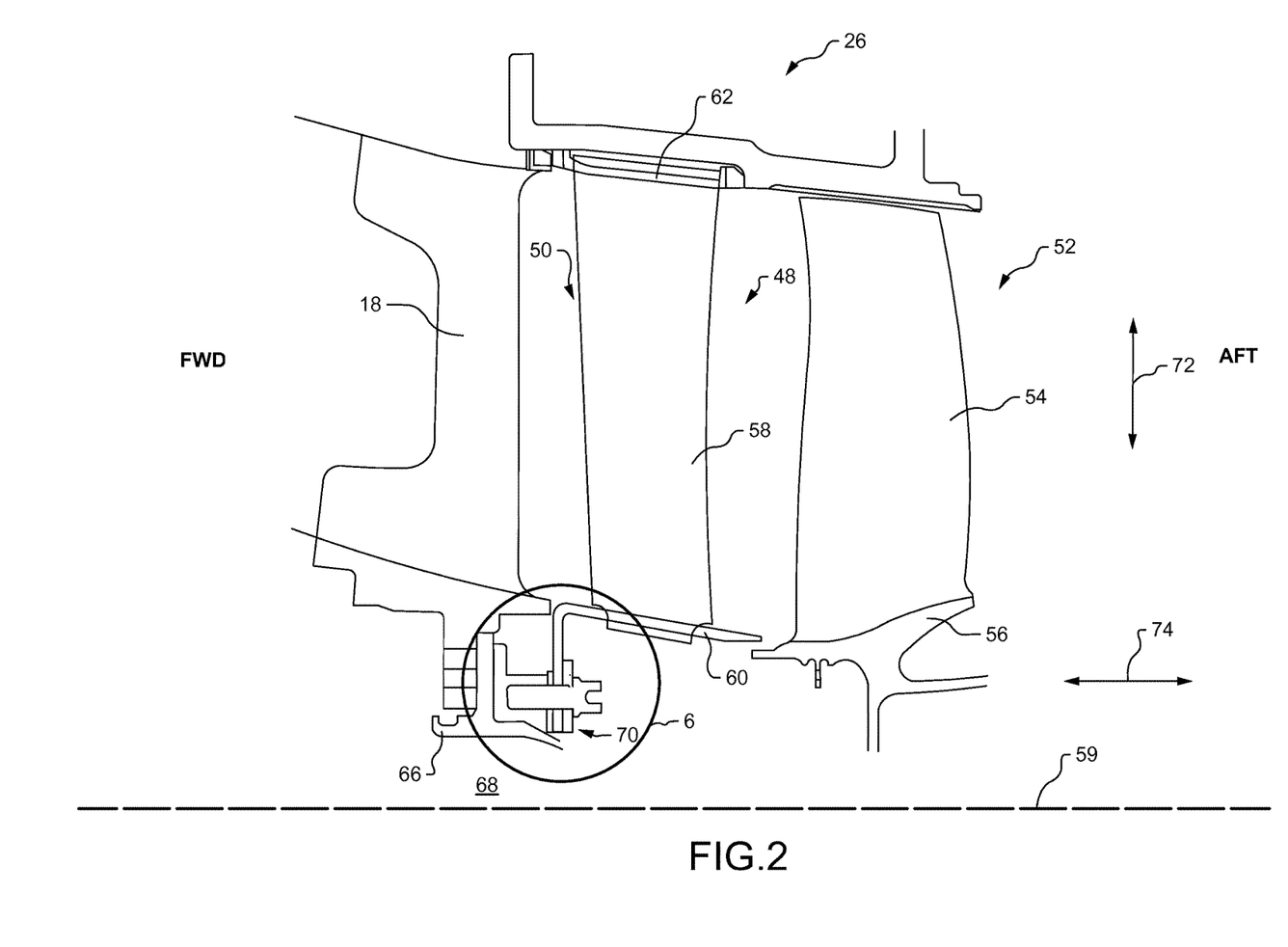
FIG. 2 is a cross-sectional view of a thermal and structural conduit between a fan intermediate case and an inner diameter (ID) shroud of an inlet stator assembly of a low pressure compressor of the gas turbine engine of FIG. 1, constructed in accordance with the present disclosure.

Turning now to FIG. 2, the LPC 26 includes an inlet stator assembly 48 at an inlet 50 to the LPC 26. The inlet stator assembly 48 is located axially forward (or upstream) of a rotor assembly 52. The rotor assembly 52 includes a plurality of blades 54 connected to a rotatable disc or hub 56.

The inlet stator assembly 48 includes a plurality of non-rotating inlet guide vanes 58 extending radially about an engine central axis 59, with each of the inlet guide vanes 58 extending between an inner diameter (ID) shroud 60 and an outer diameter (OD) shroud 62 located radially outward of the ID shroud 60. The ID shroud 60 is connected to the fan intermediate case 18 located axially forward of the inlet stator assembly 48. In particular, the ID shroud 60 is connected to a bearing support 66 of the fan intermediate case 18 via a guide structure, or conduit 70, as described in further detail below.

Air 40 at the inlet 50 of the LPC 26 is relatively cold compared with higher temperature compressed and/or combusted gases at other regions of the primary flow path 42. Thus, according to general practice, the ID shroud 60 is formed, at least in part, from a lightweight material such as aluminum, although other materials may also be used. In addition, the fan intermediate case 18 as well as the bearing support 66 is formed, at least in part, from a high yield strength material, such as titanium. However, it will be understood that the ID shroud 60, the bearing support 66, and the fan intermediate case 18 may be formed from the same material or other materials having different coefficients of thermal expansion.

If the ID shroud 60 is formed from aluminum and the fan intermediate case 18/bearing support 66 is formed from titanium, the ID shroud 60 will experience more dramatic thermal expansions and contractions in response to local temperature fluctuations than the bearing support 66 and the fan intermediate case 18 since aluminum has a significantly higher coefficient of thermal expansion (CTE) than titanium. In particular, at certain flight points, the ID shroud 60 may undergo thermal contraction due to exposure to relatively cold air at the inlet 50 of the LPC 26, while the fan intermediate case 18 and the bearing support 66 may undergo thermal expansion due to proximity to hot engine oil 68 which may reach temperatures of 250° F. or more. If not permitted to expand or contract at least somewhat independently of one another, the thermal expansion mismatch between the fan intermediate case 18/bearing support 66 and the ID shroud 60 could lead to high stresses and possible low cycle fatigue in the ID shroud 60.

According to an aspect of the present disclosure, the junction between the bearing support 66 and the ID shroud 60 includes the conduit 70 for guiding the thermal and structural motion of the ID shroud 60. The conduit 70 connects the ID shroud 60 to the bearing support 66, while allowing the ID shroud 60 to radially float with respect to the bearing support 66 and the fan intermediate case 18 to alleviate potential stresses in the ID shroud 60. Specifically, as explained in further detail below, the conduit 70 permits a radial motion 72 of the ID shroud 60 with respect to the central axis 59, while restricting an axial motion 74 and a circumferential rotation 76 (see FIG. 7) of the ID shroud 60 with respect to the central axis 59.

Figures 3, 4, 5:
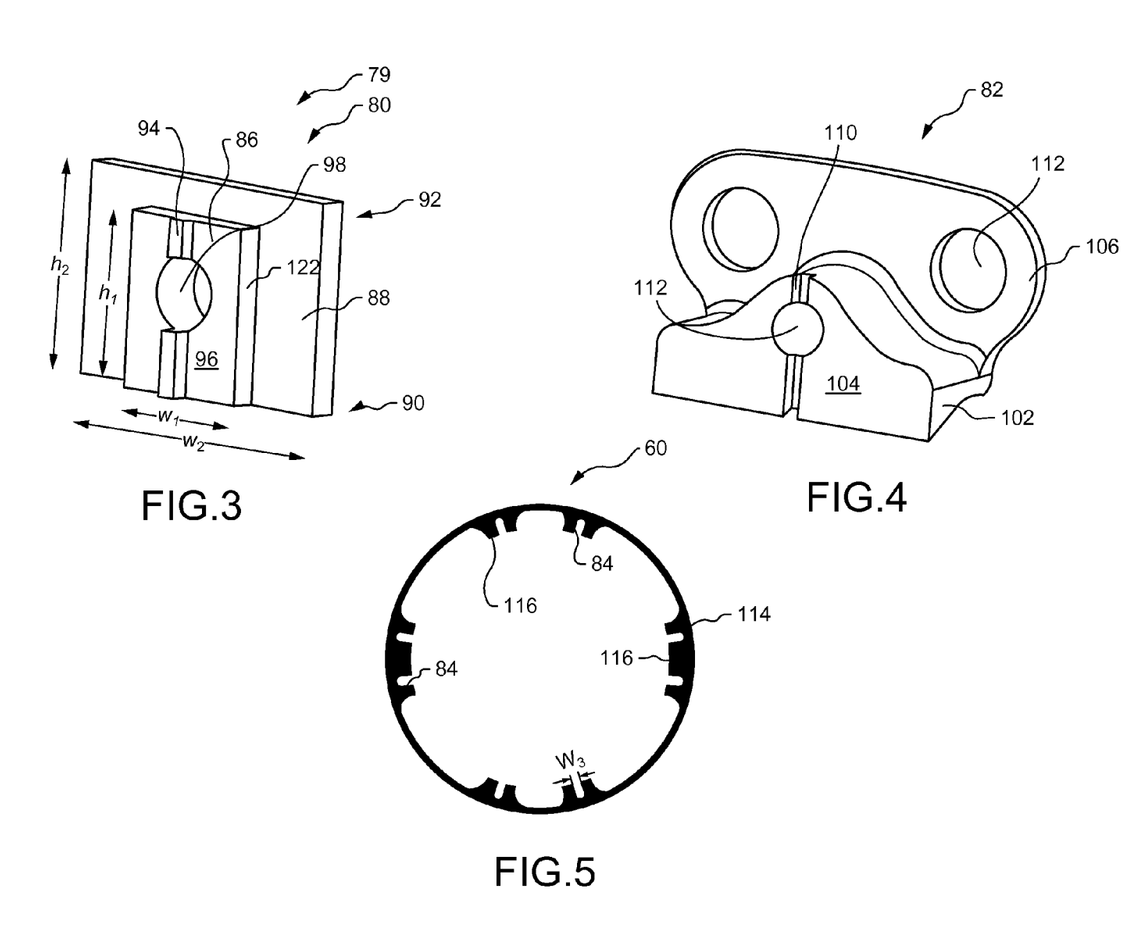
FIG. 3 is a perspective view of a T-bushing of the conduit shown in isolation, constructed in accordance with the present disclosure.
FIG. 4 is a perspective view of a bracket of the conduit shown in isolation, constructed in accordance with the present disclosure.
FIG. 5 is an AFT view of the ID shroud shown in isolation, constructed in accordance with the present disclosure.

Referring now to FIGS. 3-5, the components of the conduit 70 are shown in isolation. In general, the components of the conduit 70 include a bushing 79, such as a T-bushing 80, and a bracket 82. The T-bushing 80 and the bracket 82 assemble with a slot 84 formed in the ID shroud 60 to provide the conduit 70, as explained in further detail below.

The T-bushing 80 consists of a first panel 86 connected to or formed integrally with a second panel 88. As one possibility, the first panel 86 and the second panel 88 have rectangular shapes, and the first panel 86 has a smaller lateral width ($w_1$) than a lateral width ($w_2$) of the second panel 88. In addition, the first panel 86 has a smaller height ($h_1$) than a height ($h_2$) of the second panel 88, as shown. The first panel 86 and the second panel 88 are flush on a bottom portion 90 of the T-bushing 80, and staggered at a top portion 92 of the T-bushing 80. The T-bushing 80 further includes a height-wise extending ridge 94 protruding from a forward face 96 of the first panel 86, as well as an aperture 98 configured to receive a fastener 100 (see FIG. 6).

Figure 6:
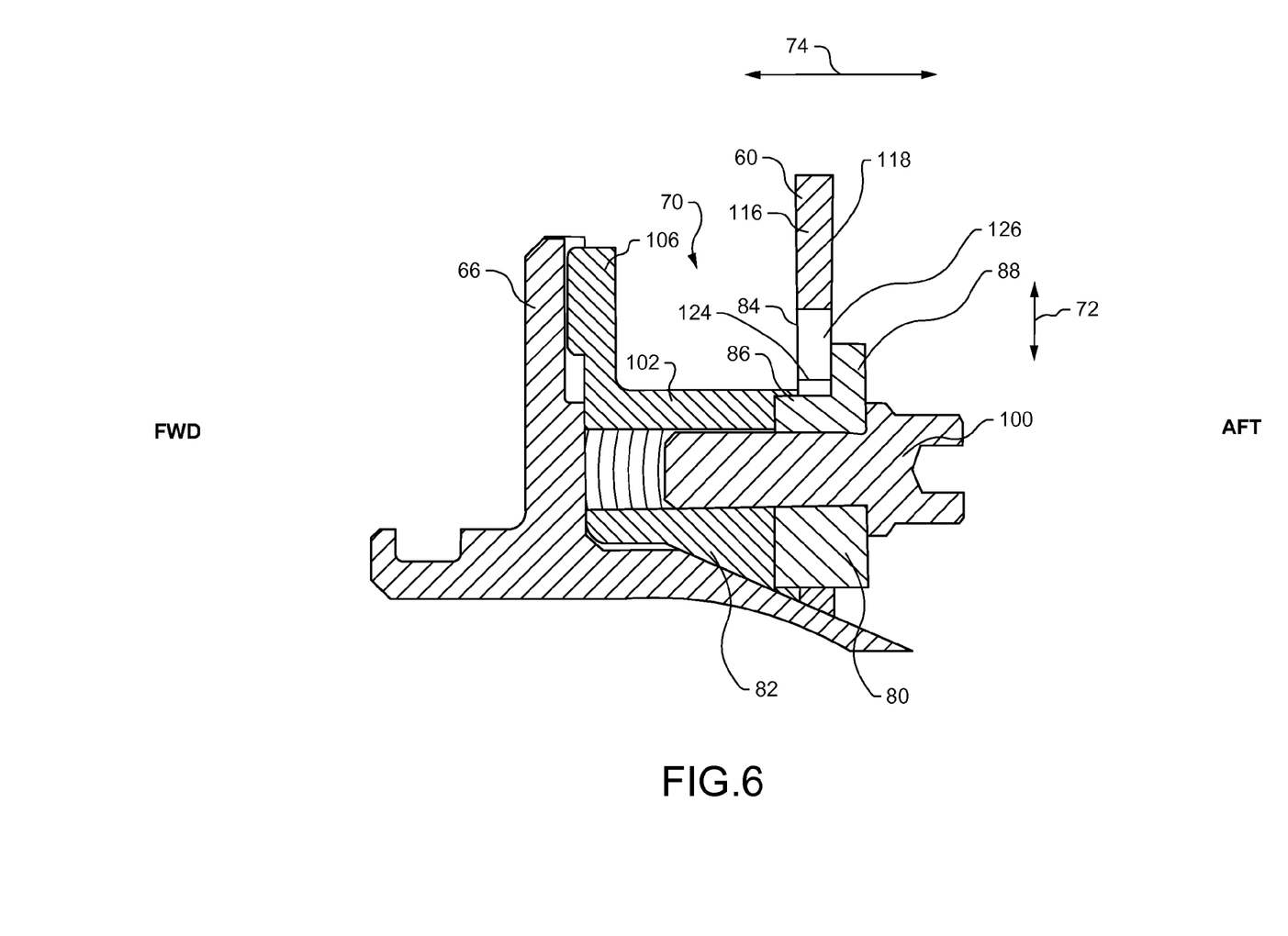
FIG. 6 is an expanded view of detail 6 of FIG. 2, illustrating the conduit, constructed in accordance with the present disclosure.

The bracket 82 includes an aft portion 102 with an aft face 104, and a forward portion 106 with a forward face 108 (also see FIG. 6). When assembled in the conduit 70, the aft face 104 contacts the forward face 96 of the T-bushing 80 (see FIG. 8 and further details below). The aft face 104 of the bracket 82 also includes a height-wise extending slot 110 that is configured to receive the ridge 94 of the T-bushing when assembled in the conduit 70. In addition, when assembled in the conduit 70, the forward face 108 of the bracket 82 contacts the bearing support 66 (see FIG. 6 and further details below). Furthermore, the aft portion 102 and the forward portion 106 each include one or more apertures 112 extending therethrough to receive one or more fasteners.

The ID shroud 60 is a full 360° ring hoop having a frame 114. In addition, the ID shroud 60 includes one or more radially inwardly extending flanges 116 through which the slots 84 are formed. The ID shroud 60 includes at least three slots 84 distributed about a circumference of the ID shroud 60. Each of the slots 84 allows the assembly of a conduit 70 therethrough (see FIGS. 6-8), and the conduits 70 also serve to center the ID shroud 60. Therefore, a plurality conduits 70 may be distributed about the circumference of the ID shroud 60 at the location of each of the slots 84. Each of the slots 84 are configured to loosely receive the first panel 86 of the T-bushing (see FIGS. 6-8 and further details below). In this regard, the lateral width ($w_1$) of the first panel 86 of the T-bushing 80 is slightly less than a lateral width ($w_3$) of each slot.

Figure 7:
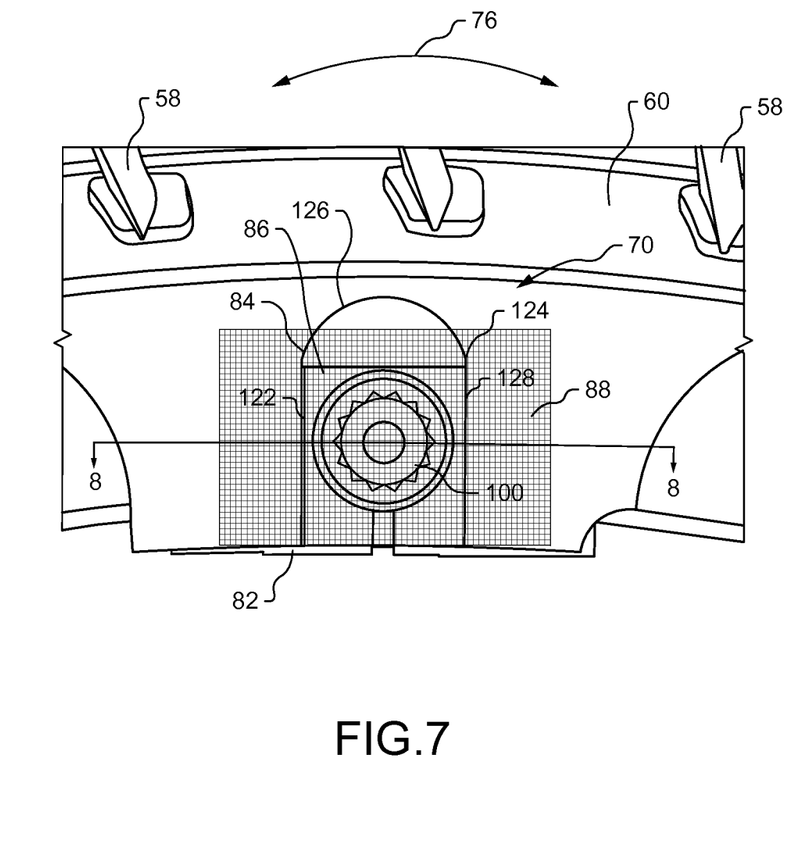
FIG. 7 is an aft view of the conduit with a second panel of the T-bushing transparent for clarity purposes, constructed in accordance with the present disclosure.
Figure 8:
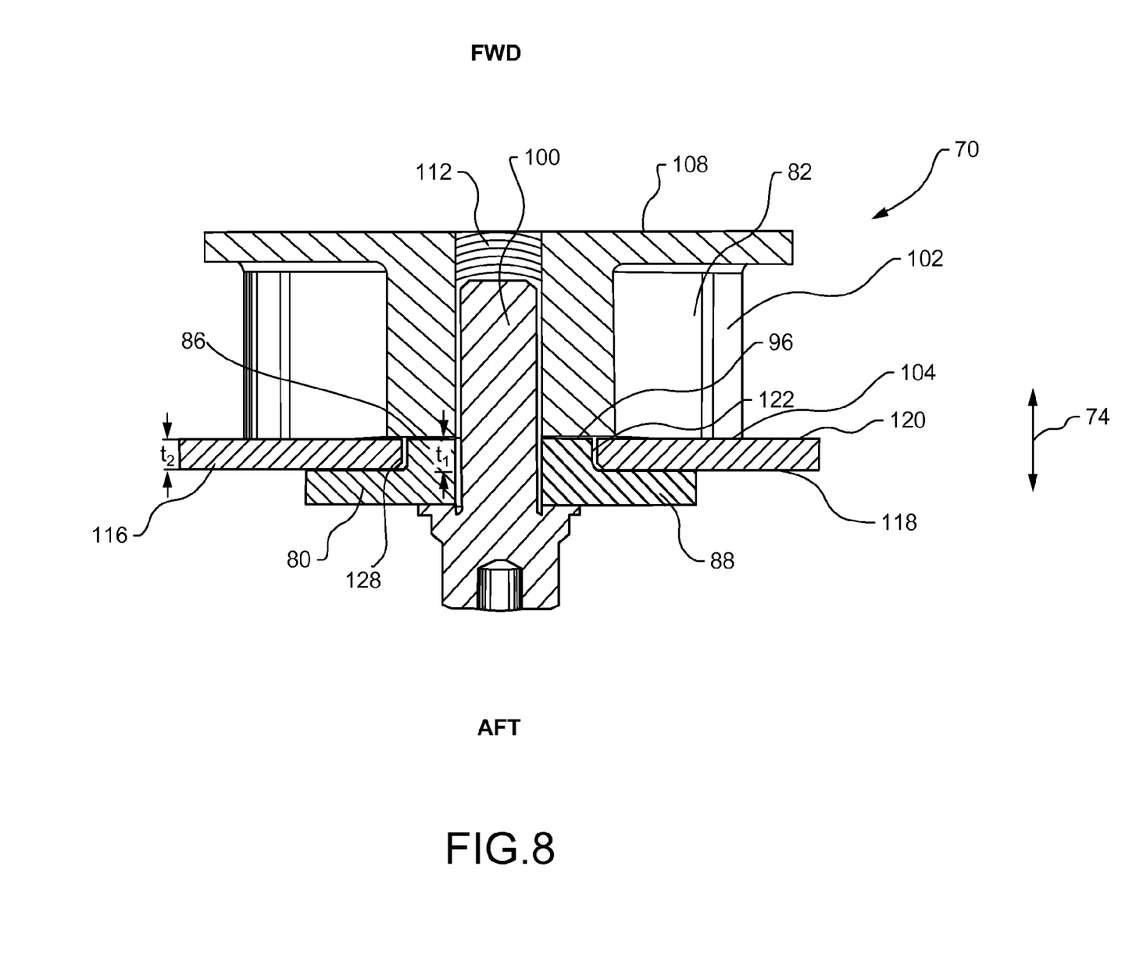
FIG. 8 is a cross-sectional view through the section 8-8 of FIG. 7, showing the conduit in isolation, constructed in accordance with the present disclosure.

Turning now to FIGS. 6-8, the conduit 70 is shown in more detail. In the conduit 70, the forward face 108 of the bracket 82 contacts the bearing support 66, and the bracket 82 is attached to the bearing support 66, as best shown in FIG. 6. As one possibility, the bracket 82 is attached to the bearing support 66 using one or more fasteners inserted through the aperture(s) 112 of the forward portion 106. In addition, as best shown in FIG. 8, the first panel 86 of the T-bushing 80 is inserted in the slot 84 of the ID shroud 60, with the forward face 96 of the first panel 86 contacting the aft face 104 of the bracket 82. Furthermore, the T-bushing 80 is inserted in the slot 84 through an aft face 118 of the flange 116 such that the second panel 88 contacts or closely approaches the aft face 118 of the flange 116. In this arrangement, a forward face 120 of the flange 116 contacts or closely approaches the aft face 104 of the bracket 82, such that the flange 116 is positioned between the second panel 88 of the T-bushing 80 and the aft face 104 of the bracket 82. The T-bushing 80 is attached to the bracket 82 with the fastener 100 that is inserted through the aperture 98 of the T-bushing 80 and the aperture 112 of the aft portion 102 of the bracket 82, as shown.

The conduit 70 allows the radial motion 72 of the ID shroud with respect to the engine central axis 59 by allowing the slot 84 to slide radially along outer edges 122 of the first panel 86, as best shown in FIGS. 7-8. In particular, an axial thickness ($t_1$) of the first panel 86 is slightly greater than an axial thickness ($t_2$) of the flange 116 in order to provide sufficient clearance to allow the flange 116 to slide radially between the T-bushing 80 and the bracket 82 (see FIG. 8). In addition, as best shown in FIGS. 6-7, the radial contraction of the ID shroud 60 is delimited by a boundary 124 defined by the tangency of the radius 126 of the slot 84.

Furthermore, the conduit 70 restricts the axial motion 74 of the ID shroud 60 with respect to the engine central axis 59. Specifically, as best shown in FIG. 8, the ID shroud 60 is restricted from moving axially forward by a contact between the forward face 120 of the flange 116 and the aft face 104 of the bracket 82. In addition, the ID shroud 60 is restricted from moving axially aft by a contact between the aft face 118 of the flange 116 and the second panel 88 of the T-bushing 80. In this way, the conduit 70 assists in preventing the ID shroud 60 from striking other axially upstream or downstream components of the engine 10.

Turning now to FIG. 7, the second panel 88 of the T-bushing 80 is shown as transparent to more clearly illustrate some of the features of the conduit 70. As can be seen, the contact between inner edges 128 of the slot 84 and the outer edges 122 of the first panel 86 of the T-bushing 80 restricts the circumferential rotation 76 of the ID shroud 60 with respect to the engine central axis 59 (also see FIG. 8). In this way, the conduit 70 also prevents the inlet guide vanes 58 from rotating. In addition, the engagement of the ridge 94 of the T-bushing 80 with the slot 110 of the bracket 82 restricts the circumferential rotation 76 of the T-bushing 80 when the fastener 100 is torqued.

Figure 9:
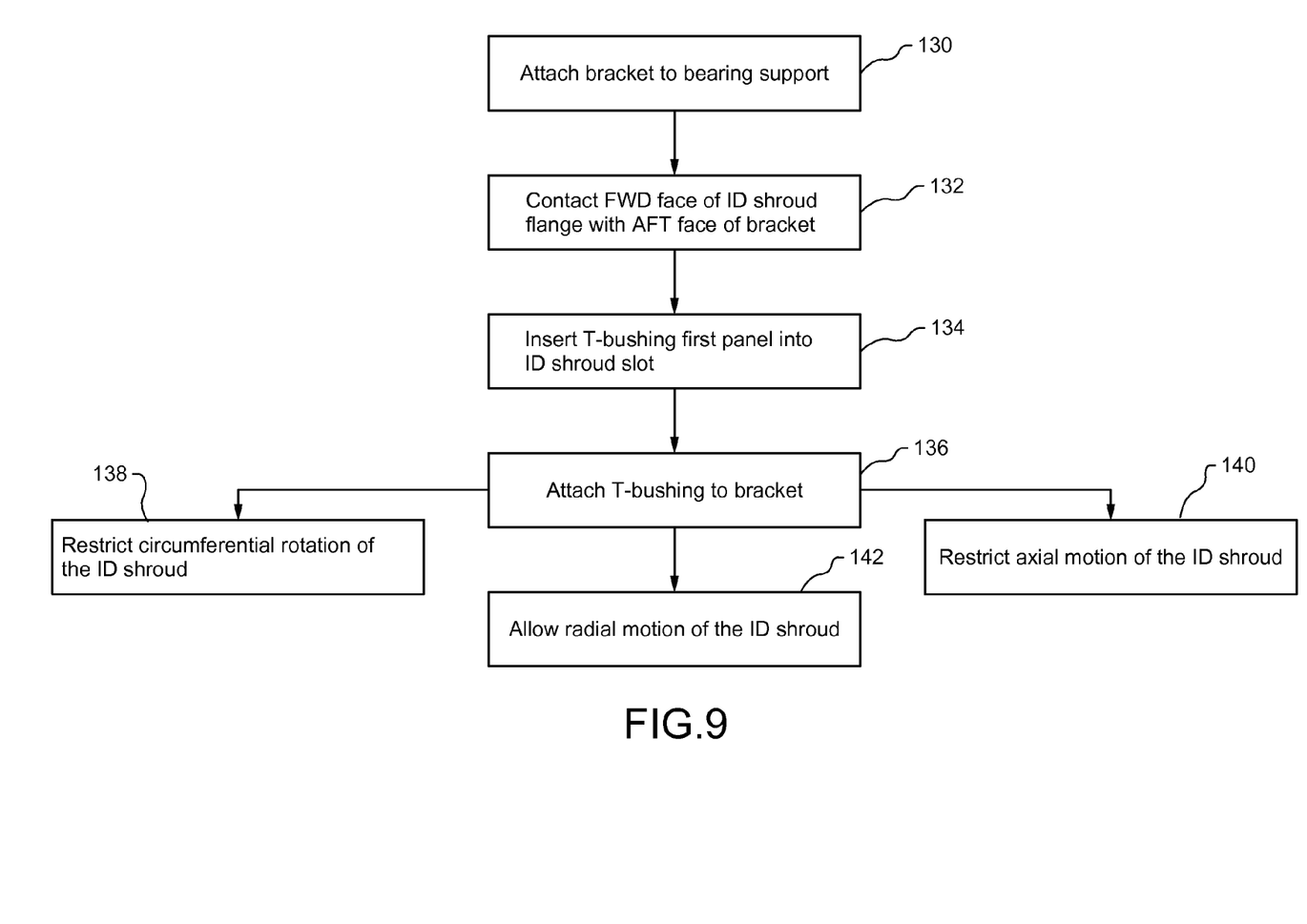
FIG. 9 is flowchart illustrating a sample sequence of steps which may be involved in using the conduit to guide the motion of the ID shroud, in accordance with a method of the present disclosure.

A series of steps which may be involved in assembling the thermal and structural conduit 70 and using the conduit 70 to guide the motion of the ID shroud 60 are illustrated in FIG. 9. Beginning with a first step 130, the bracket 82 is attached to the bearing support 66 using a mechanical connection such as fasteners and/or an adhesive attachment as described above. The forward face 120 of the flange 116 of the ID shroud 60 is then be placed against the aft face 104 of the bracket 82 with the slot 84 aligned with the aperture 112 of the aft portion 102 of the bracket 82, according to a next step 132, as shown. According to a next step 134, the first panel 86 of the T-bushing 80 is then inserted into the slot 84 with the outer edges 122 being positioned inside of the inner edges 128 of the slot 84. In addition, during the step 134, the second panel 88 is placed in contact with the aft face 118 of the flange 116, and the forward face 96 of the first panel 86 is placed in contact with the aft face 104 of the bracket 82. The T-bushing 80 is then attached to the bracket 82 to provide the conduit 70 according to a next step 136. The steps 130, 132, 134, and 136 may be repeated as necessary to assemble a conduit 70 in each of the slots 84 of the ID shroud 60. In addition, it is noted that the assembly of the conduit 70 as described above may be performed in a different order than that shown in FIG. 9.

Once assembled, the conduit 70 is used to guide the motion of the ID shroud 60 according to the steps 138, 140, and 142. According to the step 138, the contact between the outer edges 122 of the T-bushing first panel 86 and the inner edges 128 of the ID shroud slot 84 restricts the circumferential rotation 76 of the ID shroud 60 in response to aerodynamic loads on the vanes 58 or other influences. According to the step 140, the contact between the forward face 120 of the ID shroud flange 116 and the aft face 104 of the bracket 82, and the contact between the aft face 118 of the ID shroud flange 116 and the T-bushing second panel 88 restricts the axial motion 74 of the ID shroud 60. In addition, the conduit 70 allows the radial motion 72 of the ID shroud 60 according to the step 142. Thus, the ID shroud 60 may radially float with respect to the bearing support 66/fan intermediate case 18, thereby substantially reducing or eliminating stresses in the ID shroud 60 caused by thermal expansion mismatches between the ID shroud 60 and the bearing support 66/fan intermediate case 18.

INDUSTRIAL APPLICABILITY

In general, it can therefore be seen that the technology disclosed herein has industrial applicability in a variety of settings including, but not limited to, gas turbine engines. The thermal and structural conduit disclosed herein allows an ID shroud of the inlet stator assembly of the LPC that is mated to a bearing support of a fan intermediate case to radially expand and contract independently of the bearing support and the fan intermediate case. Advantageously, this mitigates or eliminates stresses in the ID shroud due to thermal expansion mismatches between the ID shroud and the bearing support/fan intermediate case, as well as the different local temperatures experienced at the ID shroud and the bearing support/fan intermediate case. At certain flight points, the ID shroud may shrink radially due to exposure to relatively cold air in the primary flow path, while the fan intermediate case may expand due to exposure to high temperatures from hot engine oil. The conduit disclosed herein provides the ID shroud with sufficient freedom to radially float with respect to the bearing support/fan intermediate case to allow such movements without strain. It is expected that the technology disclosed herein may find wide industrial applicability in a wide range of areas such as, but not limited to, aerospace technologies.

What is claimed is:

1. An inner diameter shroud of low pressure compressor of gas turbine engine, the inner diameter shroud comprising:
at least three slots formed in one or more radially inwardly extending flanges, including a first slot formed in a first flange, and conduits for guiding motion of the inner diameter shroud, each of the conduits being configured to assembled with a respective one of the at least three slots,
wherein the conduits include:
a bushing having a first panel, the first panel capable of being inserted in the first slot; and
a bracket capable of being attached to a bearing support of a fan intermediate case of the gas turbine engine, the bushing capable of being attached to the bracket, a contact between the first panel and the first slot of the inner diameter shroud restricting a circumferential rotation of the inner diameter shroud with respect to a central axis of the gas turbine engine when the first panel is inserted in the first slot, but allowing a radial motion of the inner diameter shroud with respect to the central axis.

2. The inner diameter shroud of claim 1, wherein a lateral width of the first panel is less than a lateral width of the first slot.

3. The inner diameter shroud of claim 1, wherein the first panel includes outer edges configured to contact inner edges of the first slot, the contact between the outer edges of the first panel and the inner edges of the first slot restricting the circumferential rotation of the inner diameter shroud.

4. The inner diameter shroud of claim 3, wherein the bushing is a T-bushing.

5. The inner diameter shroud claim 4, wherein the T-bushing further includes a second panel.

6. The inner diameter shroud of claim 5, wherein a lateral width of the first panel is smaller than a lateral width of the second panel.

7. The inner diameter shroud of claim 6, wherein the second panel is configured to contact an aft face of the first flange, and wherein the contact between the second panel and the aft face of the first flange restricts an axial motion of the inner diameter shroud with respect to the central axis.

8. The inner diameter shroud of claim 7, wherein an aft face of the bracket is configured to contact a forward face of the first flange, and wherein the contact between the aft face of the bracket and a forward face of the first flange further restricts the axial motion of the inner diameter shroud with respect to the central axis.

9. The inner diameter shroud of claim 8, wherein the T-bushing further includes a height-wise extending ridge protruding from a forward face of the first panel, and wherein the bracket includes a second slot that is a height-wise extending slot, the second slot being is configured to receive the height-wise extending ridge.

10. The inner diameter shroud of claim 9, wherein an axial thickness of the first panel is thicker than an axial thickness of the first flange to provide a clearance to allow the radial motion of the inner diameter shroud.

11. The inner diameter shroud of claim 10, wherein the T-bushing is configured to mechanically attach to the bracket with at least one fastener.

12. The inner diameter shroud of claim 11, wherein the bracket further includes an aperture, wherein the T-bushing further includes an aperture extending through the first panel and the second panel, and wherein the aperture of the bracket and the aperture of the T-bushing are configured to receive the at least one fastener.

13. A gas turbine engine, comprising:
a fan section; a fan intermediate case having a bearing support;
a compressor section located downstream of the fan intermediate case, the compressor section including a low pressure compressor and a high pressure compressor, the low pressure compressor having an inlet stator assembly including an inner diameter shroud supporting a plurality of inlet guide vanes, the inner diameter shroud having at least three slots formed in one or more radially inwardly extending flanges, including a first slot formed in a first flange;
conduits for guiding a motion of the inner diameter shroud, each of the conduits being associated with a respective one of the at least three slots and including a bushing having a first panel, the first panel being inserted in a respective one of the at least three slots of the inner diameter shroud, and a bracket attached to the bearing support of the fan intermediate case, the bushing being attached to the bracket, a contact between the first slot of the inner diameter shroud and the first panel restricting a circumferential rotation of the inner diameter shroud with respect to a central axis of the gas turbine engine but permitting a radial motion of the inner diameter shroud with respect to the central axis;
a combustor located downstream of the compressor section; and a turbine section located downstream of the combustor.

14. The gas turbine engine of claim 13, wherein the bushing is a T-bushing that includes a second panel having a lateral width that is larger than a lateral width of the first panel.

15. The gas turbine engine of claim 14, wherein the second panel is configured to contact an aft face of the first flange, and wherein the contact between the second panel and the aft face of the first flange restricts an axial motion of the inner diameter shroud with respect to the central axis.

16. The gas turbine engine of claim 15, wherein an aft face of the bracket is configured to contact a forward face of the first flange, and wherein the contact between the aft face of the bracket and the forward face of the first flange further restricts the axial motion of the inner diameter shroud.

17. The gas turbine engine of claim 16, wherein the inner diameter shroud has a coefficient of thermal expansion that is higher than a coefficient of thermal expansion of the bearing support and the fan intermediate case.

18. The gas turbine engine of claim 16, wherein the T-bushing further includes a height-wise extending ridge protruding from a forward face of the first panel.

19. The gas turbine engine of claim 18, wherein the bracket further includes a second slot, the second slot being a height-wise extending slot, the second slot receiving the height-wise extending ridge.

* * * * *